July 2, 1935.  A. LEO  2,006,643
SLICING APPARATUS
Filed Feb. 15, 1933
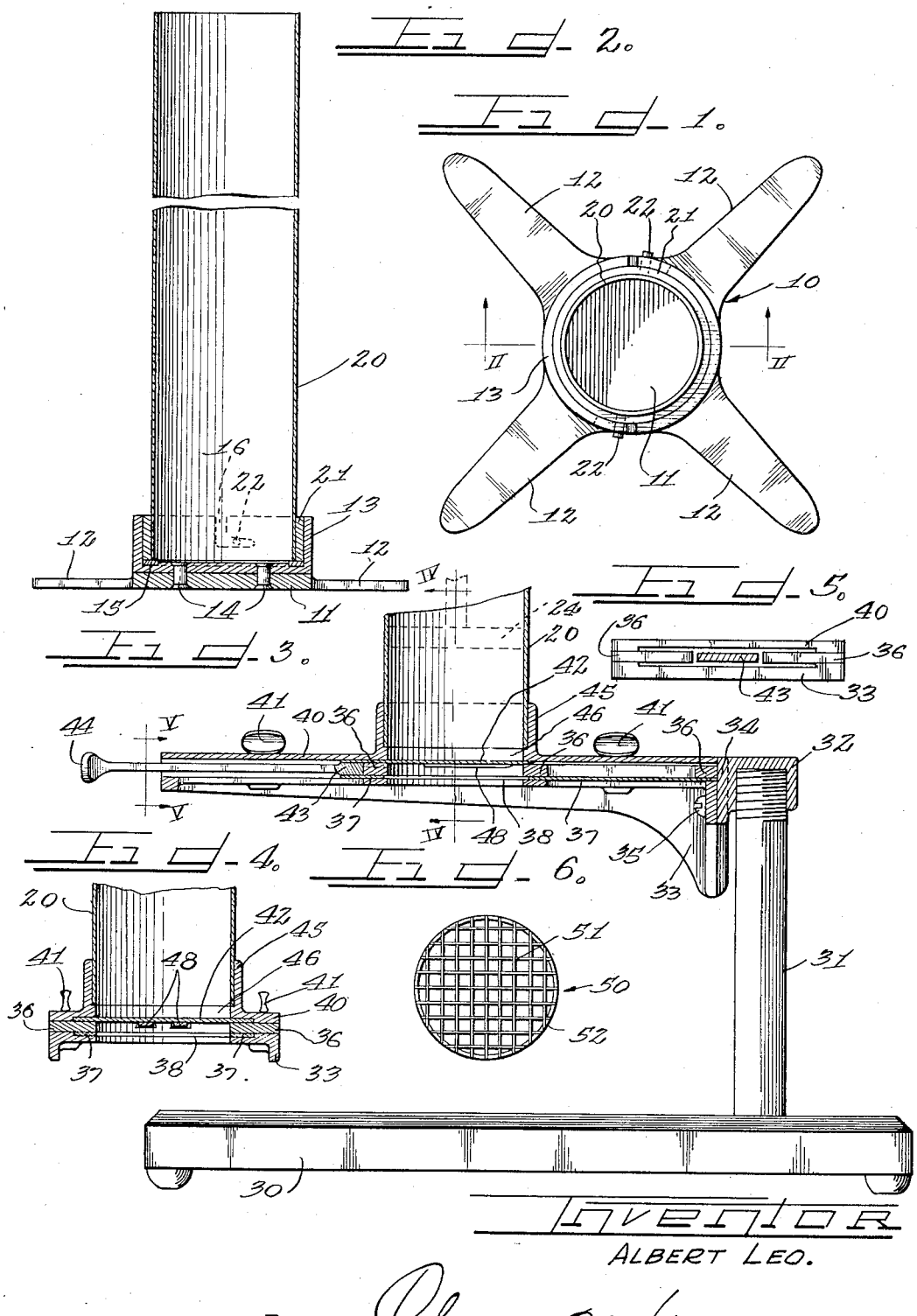
INVENTOR
ALBERT LEO.

Patented July 2, 1935

2,006,643

UNITED STATES PATENT OFFICE 2,006,643

SLICING APPARATUS

Albert Leo, Chicago, Ill.

Application February 15, 1933, Serial No. 656,812

5 Claims. (Cl. 146—62)

This invention relates to an apparatus for slicing or cutting materials such as food stuffs, for example cheese, butter, ground meats in molded form, jelly products and the like.

More specifically, this invention relates to an apparatus for slicing materials which have been either molded in a receptacle, or inserted therein, to produce slices of uniform size and thickness.

While my apparatus in adapted for the slicing of many materials, particularly food stuffs such as cheese, butter, hamburger in molded form, and any substance of a solid or semi-solid nature which can be molded, it will be specifically described, for the purpose of simplifying the disclosure, in the slicing of a material which may be poured into a receptacle and allowed to set therein to form a jell.

As described in my copending application Serial No. 656,811, filed of even date herewith, it has been customary heretofore to mold jelly in individual forms of the desired ultimate size and shape thereby necessitating the utilization and handling of many individual molds and trays.

In my present invention I may use a long vertical tubular receptacle having any desired cross sectional shape and provided with smooth inner walls to initially mold the jelly-like substance. The solution of the ingredients for the jelly preparation may be introduced into the tubular receptacle and allowed to set therein to produce a jelly-like substance or the liquid ingredients of the jelly preparation may be introduced into the receptacle and an agent then added to cause the mass to set. The jelly-like substance in the receptacle is slidable therein because of the smooth walled surfaces provided within the receptacle. The tubular receptacle may then be inverted and placed over the cutting apparatus and as the mass slides out of the receptacle it is sliced into the desired form.

It is therefore an object of this invention to provide a slicing apparatus for the preparation of uniform slices having a predetermined shape and thickness without requiring the use of individual forms.

It is a further object of this invention to provide a slicing apparatus for the preparation of jelly-like products having a uniform predetermined size and shape cut from a larger mass without the use of individual molds and dies.

Another object of this invention is to provide a slicing apparatus for extruding materials from a large mold through mechanism for directly subdividing the large mold into the desired shape and form.

A specific object of this invention is to provide an apparatus for slicing materials, fed by gravity from a long tubular receptacle, by means of a slidable knife cooperating at the base of the tube to cut the material from the tube into slices of uniform thickness.

Other and further objects of this invention will be apparent from the disclosures in the specification and the accompanying drawing.

This invention (in a preferred form) is illustrated in the drawing and hereinafter more fully described.

On the drawing:

Figure 1 is a top plan view of a tubular receptacle mounted in a base for receiving materials which, when set, are to be sliced.

Figure 2 is a cross-sectional view taken substantially along the line II—II of Fig. 1.

Figure 3 is a side elevational view, partly in cross-section, showing the slicing mechanism and manner in which the vertical receptacle is mounted therein.

Figure 4 is a cross-sectional view taken substantially along the line IV—IV of Fig. 3.

Figure 5 is a detail view taken substantially along the line V—V of Fig. 3.

Figure 6 is a plan view of a die for inserting at the base of the receptacle to dice the materials being passed through the receptacle.

As shown on the drawing:

In Fig. 1, the reference numeral 10 indicates generally the base for mounting a long vertical tubular receptacle 20 to seal the bottom thereof and to support it in vertical position. The base 10 comprises a center portion 11 of substantially circular shape for forming the bottom of the tube and has a plurality of legs 12 extending therefrom to prevent the receptacle 20 from being tipped.

A flanged circular member 13 is riveted to the portion 11 of the base 10 by means of rivets 14, (Fig. 2).

An annular gasket 15 is provided in the base of the member 13 for sealing the open end of the tubular receptacle 20 therein.

The receptacle 20 is provided at one end thereof with a metallic ring member 21 rigidly secured thereto. The ring member 21 has secured therein one or more pin members 22 for engaging in bayonet slots 16 in the flange of the circular member 13 to rigidly secure the receptacle 20 in the base 10.

The receptacle 20 is firmly twisted into the bayonet slots 16 to tightly engage its lower edge with the gasket 15.

The liquid ingredients for preparing a jelly product are now poured into the receptacle 20 and allowed to set into a semi-solid jelly mass. The gasket 15 in the base member prevents leakage of the liquid materials.

When the jell has set, the receptacle 20 is removed from the base 10, inverted, and inserted into the slicing machine so that its bottom edge is now at the top. A plunger 24 (Fig. 3) may be inserted in the receptacle 20 to loosen the jell from the side walls and cause it to drop by gravity into the slicing machine.

As shown in Fig. 3, the slicing apparatus comprises a base 30 having a vertical post 31 mounted thereon for receiving, in screw-thread relation, a cap 32 to which is secured a horizontal arm 33. The arm 33 is slidable in a groove 34 in the cap 32 and is fastened in position by means of screws such as 35.

The arm 33 is provided with recessed grooves in which a thin metallic plate 37 is slidable. Spacer plates 36 are mounted on the arm 33 above the grooves therein thereby forming a top for the grooves and providing a track for the plate 37. The plate 37 has a hole 38 therein which is somewhat larger than the open ends of the receptacle 20 and which may be brought into alignment with the receptacle as will be more fully hereinafter described.

A top plate 40 is provided with recessed grooves similar to the grooves in the arm 33 and is mounted on the spacer plates 36 and secured thereon by means of wing bolts 41. The grooves in the top plate 40 provide a passageway for a knife or plate 42 having a cutting edge.

The plates 37 and 42 are secured to a push rod 43 having a handle 44 at the end thereof for manually actuating the apparatus.

The top plate 40 is provided with an annular collar or neck portion 45 for snugly receiving the tubular receptacle 20. As shown in Figs. 3 and 4, an opening 46 is provided through the plate 40 so that materials sliding out of the receptacle 20 may contact the knife 42 when it is in the position shown in these figures, or may contact the plate 37 when the plunger arm 43 is pulled out preparatory to cutting another slice of the material.

The bottom of the knife 42 is preferably provided with runners 48 to disengage the slices from the knife edge.

The slicing operation may be briefly defined as follows.

With the plunger arm 43 in extended position, material within the vertical receptacle 20 falls by gravity or by mechanical force, exerted by the plunger 24, onto the plate 37. The plunger arm 43 is then forced inwardly by pushing on the handle 44, thereby forcing the knife 42 through the material to cut the slice therefrom, while, at the same time, moving the plate 37 so that the hole 38 therein is brought into alignment with the opening 46 in the top plate. When the knife edge reaches the position shown in Fig. 3, a slice having the thickness of the spacer plate 36 is disengaged from the knife by the runners 48 and allowed to drop through the hole 38 into a receptacle. The plunger arm is next extended by pulling on the handle 44, thereby again withdrawing the knife 42 from contact with the material in the receptacle 20 and allowing the material to drop down onto the plate 37.

It is evident that these operations produce slices of uniform thickness defined by the thickness of the spacer plate 36. The thickness of the slice may be regulated by replacing the spacer plates 36 with plates having the desired thickness and inserting spacers between the plates 37 and 42 and the plunger 43 so that the distance between these plates will be substantially the same as the thickness of the spacer plate to prevent the sliding plates from binding in the grooves. The spacer plates are readily replaced by removing the top plate 40 after loosening the wing bolts 41.

If it is desired to dice the material being sliced or separate it into parts having any desired shape, a die 50 such as is shown in Fig. 6 may be used. The die 50 may be merely a coarse mesh wire screen 51 or a series of crisscross knife blades secured to a ring 52 for mounting within the neck 45 of the top plate 40. The material, such as jelly, in the receptacle 20 is extruded through the screen and then sliced to form cubes or blocks of the desired size.

It is evident that my apparatus is excellently adapted to the cutting and slicing of materials which because of their semi-solid nature are difficult to cut to accurate sizes, or shapes. The apparatus is simple in construction and does not require skill for its operation. It is obvious that the hand-operated means 44 may be replaced by motor driven means merely by connecting the plunger arm 43 with a reciprocating arm driven by a motor.

The apparatus described can be used in the home, in restaurant kitchens, and the like places, for slicing individual portions of food stuffs such as jellies or jams. The apparatus is of great use in bakery shops for decorating pastry with preformed jelly preparations and may be used in candy factories for the preparation of gum drops and the like.

This apparatus also may be coin-actuated to dispense diced candies as suggested for the apparatus in my application Serial No. 656,811 referred to above.

In the case of hamburger, the meat may be first enclosed in a casing of a size and shape suitable for insertion into a machine of my invention. Slices of hamburger of uniform size and weight may thus be easily dispensed. Similarly, cheese may be accurately sliced to give uniform sized pieces. Where the cheese is molded directly in the tin foil to a rectangular shape, a similarly shaped tube 20 may be used in place of a cylindrical one.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. Apparatus of the class described comprising an open-ended vertical receptacle, a pair of spaced plates slidably mounted for movement across the lower open end of said receptacle, said plates having openings out of alignment with each other and adapted to successively register with the lower open end of said receptacle, said upper plate having a knife edge positioned slightly in advance of the leading edge of the opening in said lower plate during the cutting stroke, means on the under side of said upper plate in back of said knife edge for freeing material cut thereby from said underside, and stationary vertical cutting members in the bottom portion of said receptacle coacting with said knife edge to dice semi-solid material contained in said receptacle.

2. A slicing apparatus which comprises, in combination, a standard, a guide plate secured thereto and extending therefrom, a plate slidable over said guide plate and having an opening therein, a spacer plate over said slidable plate, a knife slidable over said spacer plate and extending over the opening in said slidable plate, a vertical receptacle above said knife for feeding material to be sliced thereto, means for actuating said knife and slidable plate, and means for permitting the replacement of the spacer plate to vary the thickness of the slice.

3. A slicing apparatus comprising a standard having a horizontally extending supporting arm, a plate slidable over said arm, said plate having an aperture cut therethrough, spacer means above said slidable plate, a second horizontally slidable plate above said spacer means having a knife edge extending partly over the aperture in the lower plate, a cover over said second plate having a vertically extending boss defining an aperture in said cover, an elongated tubular member in said boss, manually adjustable means for holding said plates in operative relation, said means adapted to be readily loosened for replacement of spacer means between the plates to vary the thickness of the slice, and means for reciprocating said plates.

4. A slicing apparatus including in combination, a receptacle for material to be sliced, an arm supporting said receptacle and having an opening in it in register with the receptacle, a plate slidable along said arm and having an opening in it and adapted to expose and cover said arm opening, a knife blade slidably supported by said arm and disposed above said plate in vertically spaced relation, means for supporting said plate and blade in vertically spaced relation, said means being replaceable to vary the vertical spacing of said blade with respect to said plate, means connecting said plate and blade together for simultaneous movement along said arm, and means for reciprocating said plate and blade along said arm and with respect to said first mentioned means.

5. A slicing apparatus including in combination, a receptacle for material to be sliced, a knife blade movable across the lower end of said receptacle for slicing the material therein, a plate separable from and movable with said blade for supporting the column of material in the receptacle for slicing, means vertically spacing said blade and plate and being replaceable to vary such vertical spacing as desired, and means for actuating said plate and blade for slicing purposes, said plate and blade when actuated being movable with respect to the means vertically spacing said plate and blade.

ALBERT LEO.